(12) United States Patent
Urbanek

(10) Patent No.: US 6,379,145 B1
(45) Date of Patent: Apr. 30, 2002

(54) INJECTION MOLDING OF PLASTIC MATERIALS

(75) Inventor: Otto Urbanek, Linz (AT)

(73) Assignee: Engel Maschinenbau Gesellschaft m.b.H., Schwertberg (AT)

(*) Notice: Subject to any disclaimer, the term of this patent is extended or adjusted under 35 U.S.C. 154(b) by 0 days.

(21) Appl. No.: 09/554,919
(22) PCT Filed: Jan. 18, 1999
(86) PCT No.: PCT/AT99/00011
  § 371 Date: May 22, 2000
  § 102(e) Date: May 22, 2000
(87) PCT Pub. No.: WO99/36245
  PCT Pub. Date: Jul. 22, 1999

(30) Foreign Application Priority Data

Jan. 19, 1998 (AT) .................................................. 61/98

(51) Int. Cl.[7] ................................................ B29C 45/66
(52) U.S. Cl. ........................................ 425/589; 425/595
(58) Field of Search ............................... 425/589, 590, 425/595

(56) References Cited

U.S. PATENT DOCUMENTS

| 3,353,397 A | | 11/1967 | Hoffman | |
| 3,505,708 A | * | 4/1970 | Moslo | 425/589 |
| 5,129,817 A | * | 7/1992 | Ing et al. | 425/589 |

FOREIGN PATENT DOCUMENTS

| DE | 736694 | 6/1943 |
| DE | 905225 | 3/1954 |
| DE | 4004026 | 8/1990 |
| FR | 1325028 | 7/1963 |
| JP | 06008295 | 1/1994 |

OTHER PUBLICATIONS

Kunststoffe, "Elastische Holmenhalterung vermeidet Holmenbruch", vol. 70, No. 11, Nov. 1980, pp. 772.

* cited by examiner

Primary Examiner—Tim Heitbrink
(74) Attorney, Agent, or Firm—Notaro & Michalos P.C.

(57) ABSTRACT

The invention relates to an injection molding device for plastic materials, wherein the locking pressure acting on the divided mold (1) is transmitted by a plate (2') that is traversed by cantilevers (3) supported on the outer side of the plate (2'). Preferably, the support comprises a jacket (7) having unequal peripheral wall thickness or height.

6 Claims, 5 Drawing Sheets

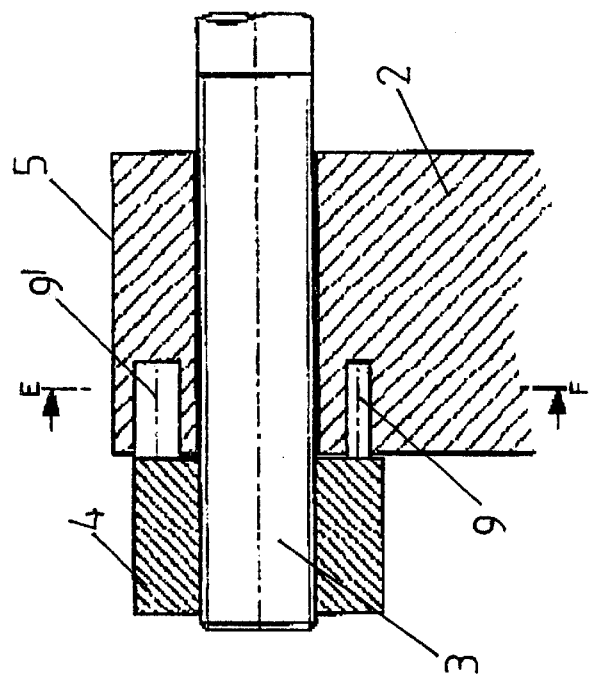
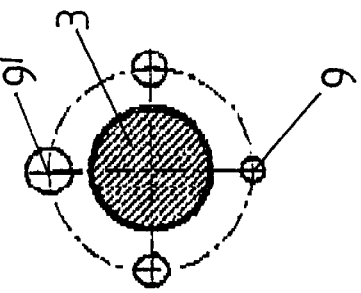
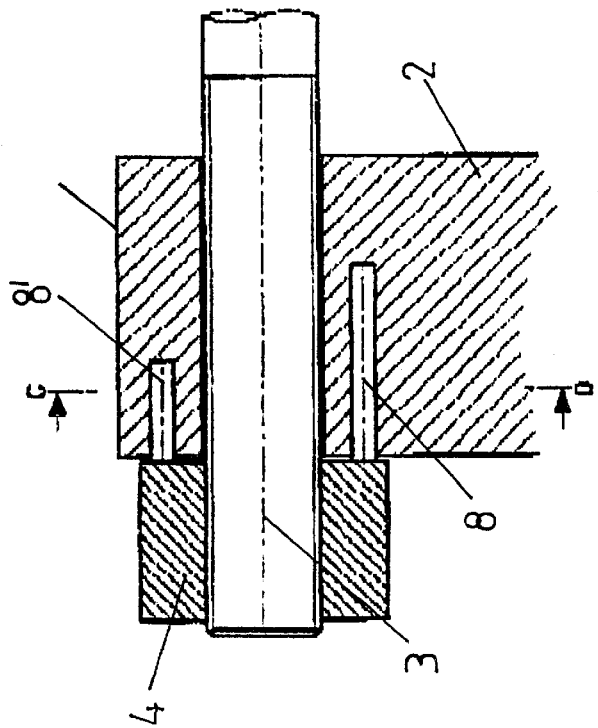
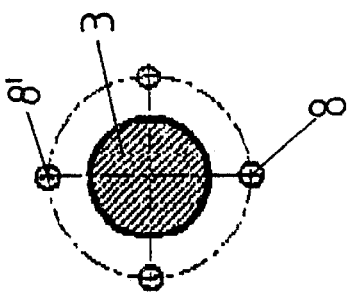

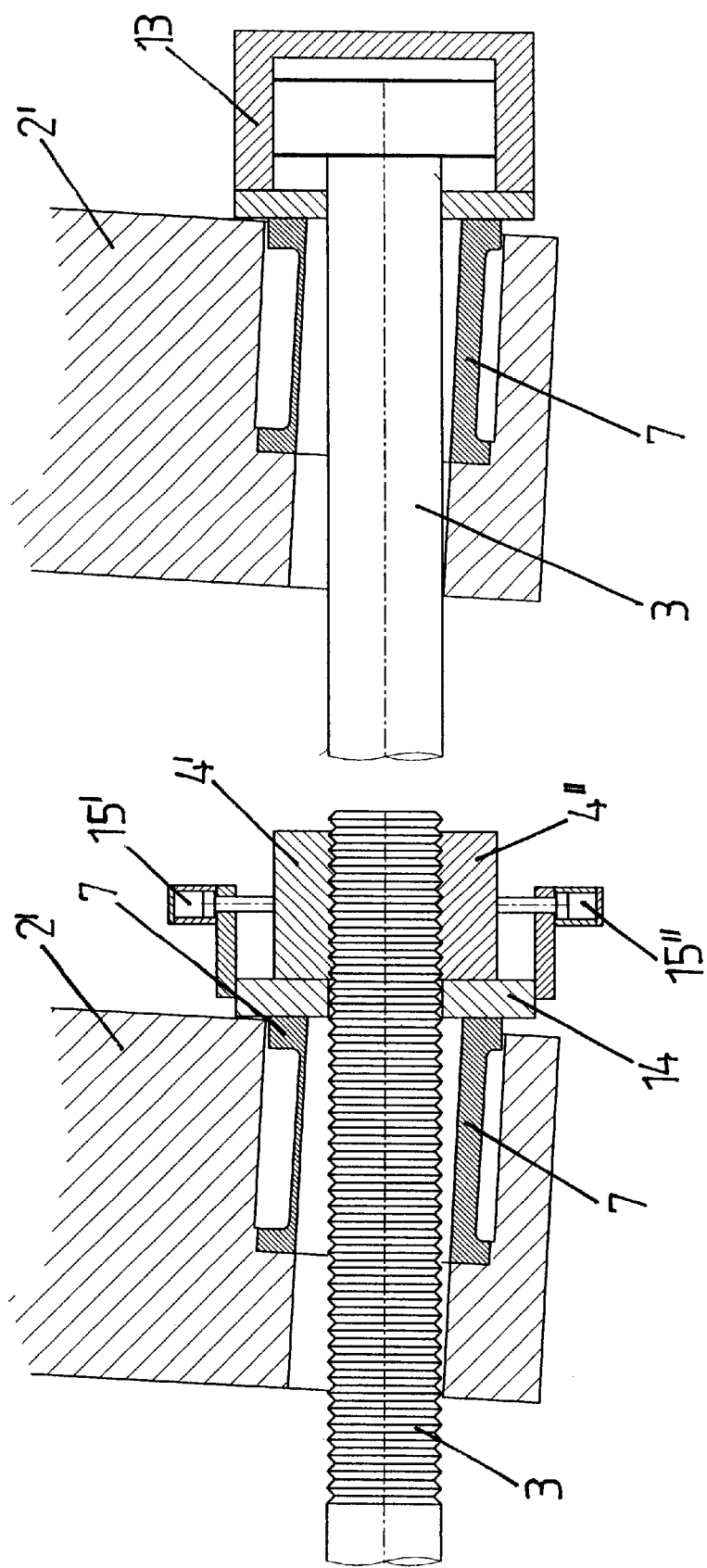

INJECTION MOLDING OF PLASTIC MATERIALS

The invention relates to an apparatus for the injection molding of plastic materials, wherein the closing force which acts on the divided mold is transmitted by two plates through which pass beam members which are supported against the outsides of the plates.

The plates against which the beam members are supported by way of nuts, pressure pads or the like bend typically under the influence of the closing force applied, in particular when the mold is substantially smaller than those plates. As a result the nuts assume an inclined position and the beam members which are in any case heavily loaded in tension by the closing force are subjected to flexural loadings in their end region. That limits the service life of the beam members.

The invention is based on the consideration that the beam members which are subjected to a loading should be kept as free as possible from flexural forces, which in accordance with the invention is achieved in that the support for the beam members is effected by means of a pressure-loaded support device which in the loaded condition, on the side of the beam members which is towards the edge of the plate, is of a greater extent in the beam member direction than on the side which is towards the center of the plate.

There are various options in regard to structurally carrying the concept of the invention into effect. In particular the nuts, pressure pads or the like which enlarge the ends of the beam members are supported by way of sleeves against the plate which is bent by the closing force, in which case on the side towards the edge of the plate the sleeves are of the greatest wall thickness or the greatest height.

BRIEF DESCRIPTION OF DRAWINGS

Further details of the invention are described hereinafter with reference to the drawing in which.

It is essential for an injection molding apparatus that, when the plastic material is injected into the divided mold, the latter is under considerable pressure so that the mold does not open under the influence of the injection pressure. A wide range of different arrangements are known for generating the closing force. Provided for that purpose in the present case is a closing piston 10 which presses against the movable mold-mounting plate 11. The closing piston 10 is supported against the plate 2 by way of the hydraulic fluid which fills the cylinder chamber 15.

Figure 1:
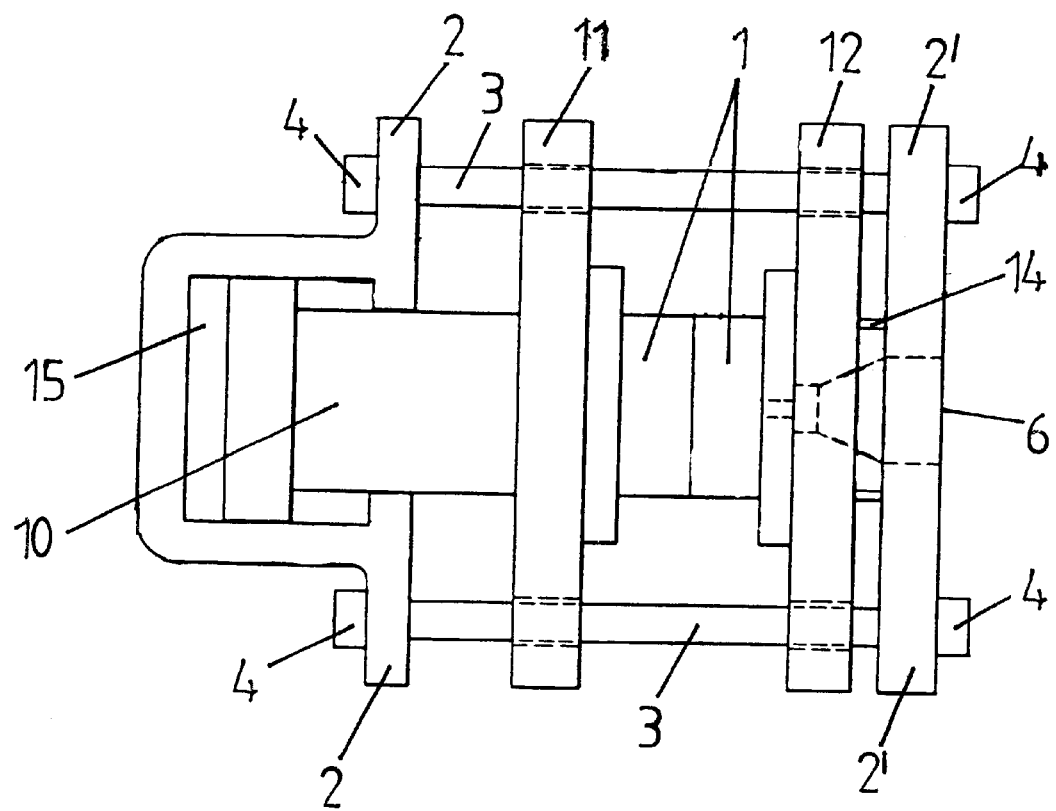
FIG. 1 is a diagrammatic side view of an injection molding apparatus.

In the embodiment shown in FIG. 1, a support ring 14 is provided between the stationary mold-mounting plate and the plate 2' which carries the closing force, so that only the plate 2' but not the mold-mounting plate 12 bends under the influence of the closing force. This provides a uniform flexural characteristic for the plate 2', irrespective of the size of the mold 1. The invention however can also be applied when the nuts 4 are supported directly against the mold-mounting plate 12.

Injection of the plastic material is effected through the center 6 of the plate 2' by means of an injection device (not shown).

Figure 2:
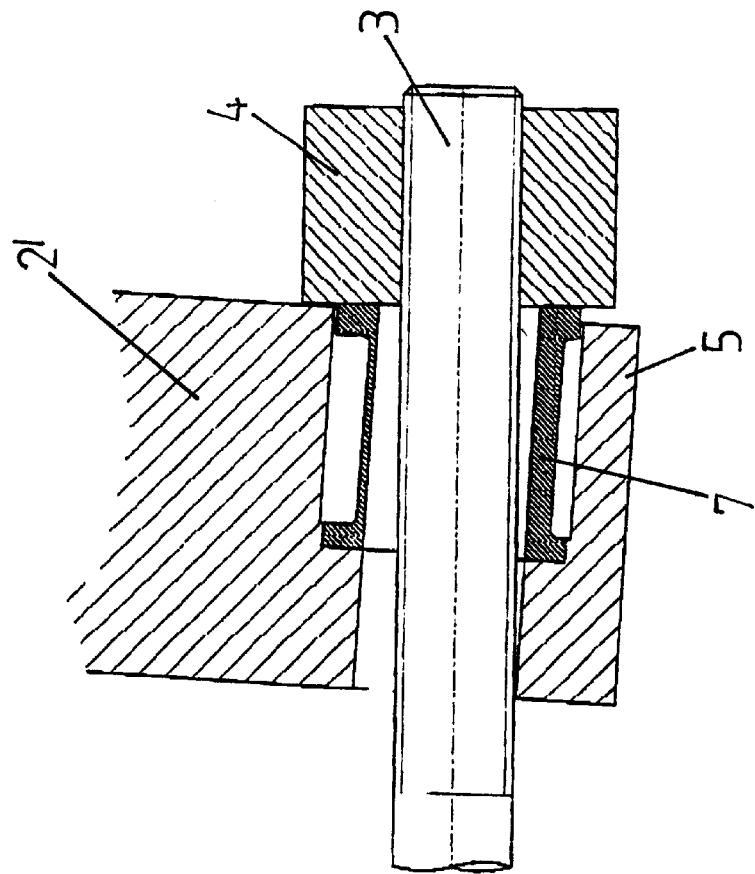
FIG. 2 is a view in longitudinal section through the bottom right edge region in FIG. 1 corresponding to the state of the art, FIG. 3 corresponds to FIG. 2 in a modification according to the invention, FIGS. 4 and 5 relate to a second and a third embodiment and the top left edge region of the apparatus in FIG. 1, FIGS. 6 and 7 show configurations of the beam member ends which are modified in relation to FIG. 1, and FIGS. 8 and 9 relate to a fourth embodiment in the unloaded and loaded conditions respectively.

FIG. 2 shows the problems involved in conventional fixing of the beam members 3 to the plates 2, 2'; as the nuts 4 bear snugly against the rear side of the plates 2, 2', which takes up an inclined position under the influence of the closing force, that involves local bending of the beam members 3 which are under tension.

Figure 3:
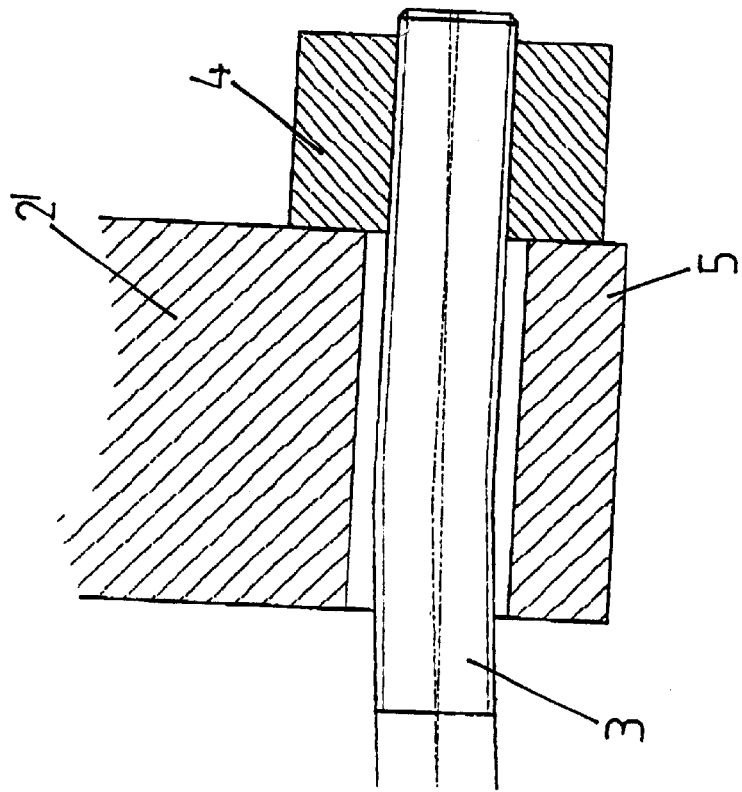

FIG. 3 shows a first possible way of so supporting the nut 4 on the side towards the edge 5 of the plate 2' that forces of equal magnitude occur at the edge, as on the side of the nut, which is towards the center 6 of the plate. That is achieved by using a sleeve 7 which is of increased wall thickness towards the side of the edge 5 of the plate 2', and which thus opposes a higher level of resistance to compression on that side. The inclined positioning of the plate 2' is thereby substantially compensated.

Referring to FIG. 4 the support for the nut 4 comprises support pins or pegs 8, 8', wherein the pins 8 which are towards the center of the plate are longer and therefore compressed to a greater degree than the pins 8' which are adjacent to the edge 5 of the plate 2.

In the embodiment shown in FIG. 5, the varying degree of compression of the pins 9' which are closer to the edge 5 and the pins 9 which are further from the edge is achieved by the differing cross-section thereof.

It will be seen from FIGS. 6 and 7 that the invention is not limited to beam members 3 which are supported against the associated plate by means of a simple nut 6. On the contrary the essential consideration is that disposed between the plate and the end portion which adjoins the plate and which is rigidly connected to the beam members is a deformable intermediate member which compensates for the deformation of the plate and thus avoids bending of the beam member.

For example, as shown in FIG. 6, the apparatus may have a nut comprising two parts 4', 4" which are pressed by cylinders 15', 15" against the end of the beam member 3. If the support for the beam member 3 against the plate 2' were effected by way of the carrier portion 14 of the cylinders 15', 15", that would entail the bending illustrated in FIG. 2. The sleeve 7 which is adapted to be non-uniformly compressible prevents bending of the beam member 3. The apparatus shown in FIG. 7 operates in the same manner, where a pressure pad 13 which produces the closing force, together with the sleeve 7 of unequal thickness, form the support for the beam member 3 against the plate 2'.

Figure 9:
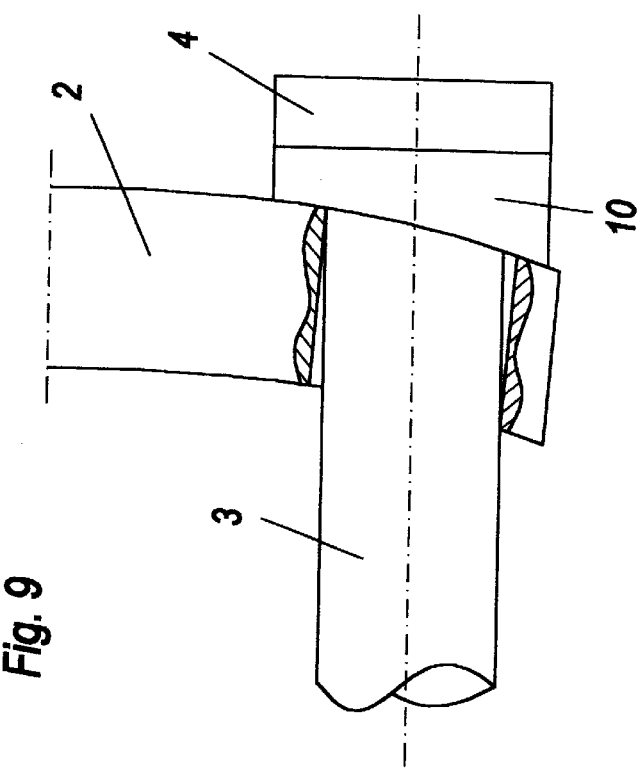
Figure 8:
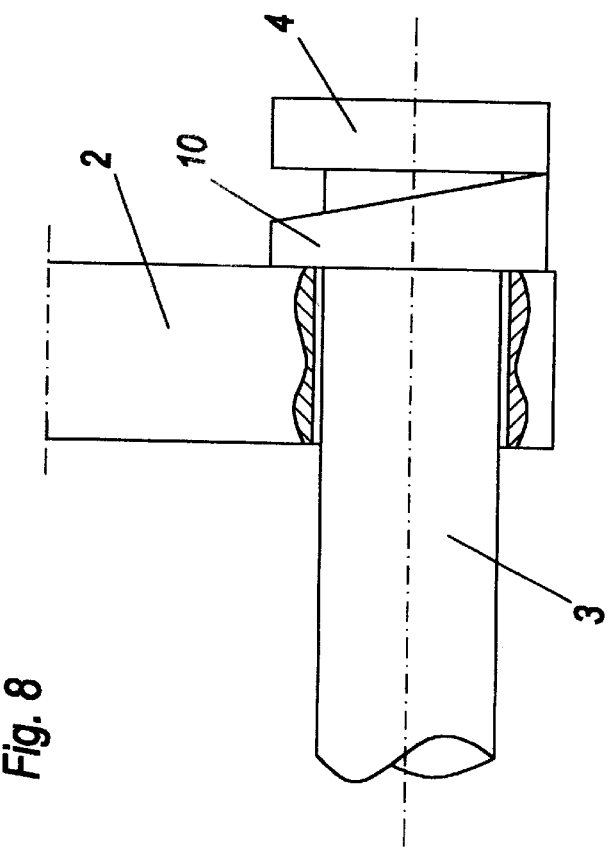

The embodiment shown in FIGS. 8 and 9 differs from the alternative configurations discussed hereinbefore in that the longitudinal extent of the support arrangement, in this case a ring 10 which surrounds the beam member 3, is at its greatest at the edge, even in the non-loaded condition. A configuration of this kind, which extends in a wedge-shape, of the support arrangement, has the advantage that it can be easily produced, starting from a homogenous ring of constant wall thickness.

What is claimed is:

1. An apparatus for injection molding of plastic materials, wherein a closing force which acts on a divided mold is transmitted by two plates through which pass beam members having a longitudinal direction and which are supported against outsides of the plates, characterized in that the support for the beam members is effected by means of a pressure-loaded support device which, in a loaded condition, on a side of the beam members which is toward an edge of the plate, is of a greater axial extent in the beam member direction, than on a side which is toward a center of the plate.

2. Apparatus as set forth in claim 1 characterized in that the support device is less compressible on the side of the beam members which is toward the edge of the plate than on the side which is toward the center of the plate.

3. Apparatus as set forth in claim 2 characterized in that the support device includes a sleeve with a wall thickness which is unequal along the periphery.

4. Apparatus as set forth in claim 2 characterized in that the support device includes support pins which are upset to differing degrees when forces of equal magnitude are applied.

5. Apparatus as set forth in claim 1 characterized in that the support device is in the form of a ring with an axial extent which decreases toward the center of the plate.

6. Apparatus as set in claim 1 characterized in that the stationary mold-mounting plate is separated by a support ring from that plate which transmits the closing force thereto.

* * * * *